April 9, 1957     G. L. STEVENS     2,787,800
PISTON GROOVE CLEANER
Filed April 27, 1953

INVENTOR.
GUY L. STEVENS
BY
Thos. S. Donnelly
ATTORNEY.

United States Patent Office 2,787,800
Patented Apr. 9, 1957

2,787,800
PISTON GROOVE CLEANER
Guy L. Stevens, Detroit, Mich.

Application April 27, 1953, Serial No. 351,223

4 Claims. (Cl. 15—104.01)

My invention relates to a new and useful improvement in a piston groove cleaner adapted for cleaning carbon deposits and other foreign materials from the grooves of a piston.

It has long been recognized that foreign material does deposit itself in the grooves of a piston so that the rings do not sit and function properly, and it has also been recognized that this deposit of foreign material consists primarily of carbon. The carbon deposits itself in the grooves and then cakes to a high degree of density, and to remove the deposit of foreign materials from the grooves oftentimes is a difficult operation.

The present invention relates to a piston groove cleaner which functions to a high degree of efficiency, and which will serve to effectively clean from the piston grooves all foreign deposits and particularly carbon which has caked therein.

It is an object of the present invention to provide a piston groove cleaner so arranged and constructed that it may be used on pistons of various sizes.

Another object of the invention is to provide a piston groove cleaner so arranged and constructed that it may be caused to function on the entire width of the piston groove.

Another object of the invention is the provision in a piston groove cleaner of this class of rotatable tooth-bearing members so arranged and constructed that they will ride in the piston groove so as to scrape all foreign material therefrom.

Another object of the invention is the provision in a piston groove cleaner of this class of tooth-bearing members normally held stationary and yet permitted to rotate upon encountering material offering a pre-determined resistance to this removal whereupon the tooth-bearing members may be permitted to rotate.

Other objects will appear hereinafter.

It is a recognized that various modifications and changes may be made in the detail of structure illustrated without departing from the invention, and it is intended that the present disclosure shall be considered but the preferred embodiment.

Forming a part of this application are drawings, in which.

Figure 1:
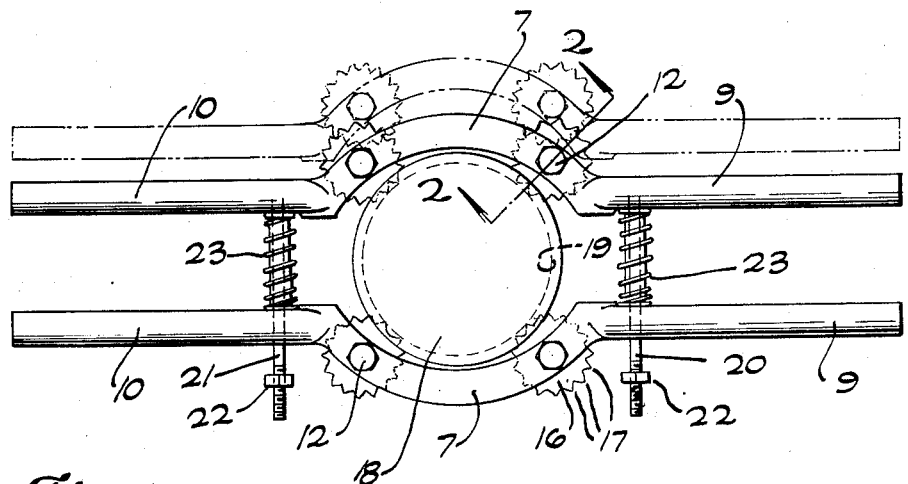
Fig. 1 is a plan view of the invention.
Figure 3:
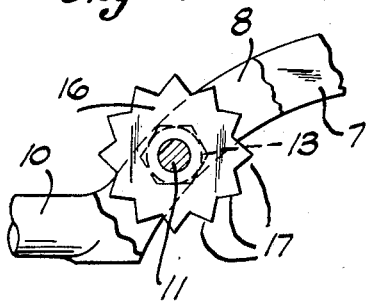
Fig. 3 is a fragmentary slightly enlarged elevational view with parts broken away.
Figure 2:
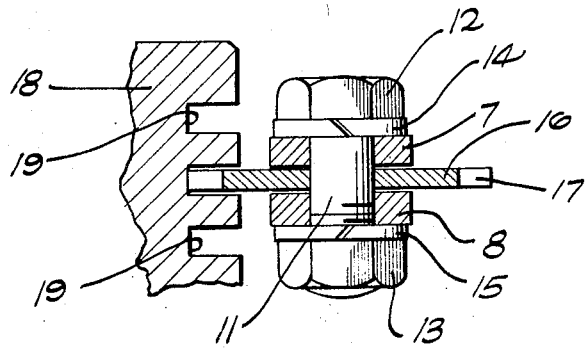
Fig. 2 is a fragmentary enlarged sectional view taken on line 2—2 of Fig. 1.

In the drawings I have illustrated the invention as comprising a pair of spaced apart arcuate plates 7 and 8, projecting inwardly from opposite sides of which are the gripping portions or handles 9 and 10. These arcuate plates are connected to and preferably are formed integral with the gripping portions 9 and 10 and are concave with respect to each other, so as to generally define an enclosed substantially circular area. Secured to one set of handles 9 and 10 are the rods 20 and 21 which slideably project through the other set of handles 9 and 10, and which are provided on their free ends with an abutment, as the nut 22 threaded thereon. Positioned between the parts 9 and the parts 10 and embracing the rods 20 and 21 are the coil springs 23 which serve normally to maintain the handles spaced apart. In Fig. 1 I have shown in full lines the handles drawn toward each other so as to properly embrace the piston 18, the normal relative position of these handles being indicated in Fig. 1 by dotted lines.

Projected through each of the plates 7 and 8 is a bolt 11 having a head 12 and provided with a nut 13 threaded thereon, the head bearing against a resilient means, as the spring washer 14, and the nut bearing against a resilient means, as the spring washer 15. Rotatably mounted on this bolt 11 between the plates 7 and 8 is a gear 16 having teeth 17 thereon. By tightening the nut 13 and the bolt 11, the plates 7 and 8 may be brought into clamping relation to the gear 16 so as to resist rotation of the gear 16.

In use, the mechanism is set over the piston 18 which is provided with the ring grooves 19 and the gears 16 are brought into alignment with one of these grooves. Thereupon the members 9 and 10 are moved from the dotted line position into the full line position shown in Fig. 1, the operator gripping the members 9 in one hand and the members 10 in the other. Ordinarily the piston 18 is stationary and the operator while gripping the parts 9 and 10 may maintain the gears 16 tightly compressed into the groove in which engaged. While so engaged, by means of the handles 9 and 10, the mechanism may be moved rotatively to the piston 18 so as to remove the carbon deposits and other foreign material which may be deposited in the groove. When encountering a particle of foreign material which is caked to such an extent that it offers severe resistance to the rotation of the mechanism relatively to the piston the gears will then rotate on the bolts 11 as an axis. In this way the gear is permitted to ride over the tightly caked material and by repeated movement over this tightly caked portion, the same may be scraped away and removed by degrees. Experience has shown that a piston groove cleaner of this class, constructed and operated in this manner, in highly efficient in use, and one which may be easily and quickly mounted on the piston and removed therefrom, and which may be easily operated for the purposes intended.

The members 9 and 10 as shown in Fig. 1 may be considered to be a pair of parallel spaced apart bars with arcuate central portions which are substantially coplanar and on which the gears are rotatably mounted in a substantially coplanar relationship.

What I claim is:

1. A piston groove cleaner of the class described, comprising: a pair of parallel spaced apart bars; an arcuate central portion on each of said bars; said arcuate portions being substantially coplanar and concave with respect to each other, so as to define an enclosed substantially circular area; a gear mounted on each of said arcuate portions and projecting inwardly therefrom for engaging in the groove of a piston; said gears being substantially coplanar with respect to each other; springs positioned between said bars for normally urging the bars away from each other and being compressible upon approach of said bars towards each other; and, means for placing frictional contact on said gears for resisting rotation of the same.

2. A piston groove cleaner of the class described comprising: a pair of parallel spaced apart bars; an arcuate central portion on each of said bars; said arcuate portions being substantially coplanar and concave with respect to each other, so as to define an enclosed substantially circular outline; a gear mounted on each of said arcuate central portions; said gears being coplanar and disposed diametrically opposite each other relative to the substantially circular outline defined by said arcuate portions; said gears projecting inwardly beyond the arcuate portion on which they are mounted for engaging in the groove of a piston; a transversely disposed rod projecting from each end of one of said parallel bars and slidably projecting through the adjacent ends of the other of said parallel bars; an abutment member on the free end of each of said rods for preventing removal of the rods from said other of said parallel bars through which it is slidably projected; a coil spring embracing that portion of each of said rods which lies between the parallel bars, and which is adapted to engage said parallel bars for normally urging the bars apart; and, means for placing friction on said gears for resisting rotation of the gears.

3. A piston groove cleaner of the class described comprising: a pair of parallel spaced apart bars; an arcuate portion at the central portion of each of said bars; said arcuate portions being substantially coplanar and concave with respect to each other, so as to define an enclosed substantially circular area; a plurality of coplanar teeth-bearing gears mounted on each of said arcuate portions and projecting inwardly of the arcuate portion on which they are mounted for engaging in the ring groove of a piston; means for securing said bars to each other for movement toward and away from each other; a spring carried on said securing means for normally urging said bars away from each other; and, resilient means for applying friction to said gears for resisting rotation of the same.

4. A piston groove cleaner of the class described comprising: a pair of parallel spaced apart bars; an arcuate portion at the central portion of each of said bars; said arcuate portions being substantially coplanar and concave with respect to each other, so as to define an enclosed substantially circular area; each of said arcuate portions comprising a pair of spaced apart plates; a plurality of coplanar teeth-bearing gears mounted on each of said arcuate portions and lying between the plates thereof and projecting inwardly of the arcuate portion on which they are mounted for engaging in the ring groove of a piston; means for securing said bars to each other for movement toward and away from each other; a spring carried on said securing means for normally urging said bars away from each other; and, means for clamping the plates of said arcuate portions against said gears for resisting rotation of the same.

References Cited in the file of this patent

UNITED STATES PATENTS

| | | |
|---|---|---|
| 573,853 | Bird | Dec. 29, 1896 |
| 1,479,829 | Olson et al. | Jan. 8, 1924 |
| 1,848,418 | Fall | Mar. 8, 1932 |
| 2,189,341 | Dumont | Feb. 6, 1940 |
| 2,362,780 | Stine | Nov. 14, 1944 |
| 2,634,637 | Crippen | Apr. 14, 1953 |
| 2,674,911 | Theis | Apr. 13, 1954 |